(12) United States Patent
MacHendrie et al.

(10) Patent No.: US 6,676,414 B1
(45) Date of Patent: Jan. 13, 2004

(54) METHOD AND COMPUTER PROGRAM FOR PLAYING AN EDUCATIONAL CARD GAME THAT TEACHES MATHEMATICAL FACTS (76) Inventors: Jennifer L. MacHendrie, 7715 Applecross, Dallas, TX (US) 75248; Kara L. Girardo, 7837 LaSobrina Dr., Dallas, TX (US) 75248

(*) Notice: Subject to any disclaimer, the term of this patent is extended or adjusted under 35 U.S.C. 154(b) by 447 days.

(21) Appl. No.: 09/687,914

(22) Filed: Oct. 13, 2000

(51) Int. Cl.⁷ .................................................. G09B 5/00
(52) U.S. Cl. ........................ 434/201; 434/191; 434/209; 273/302
(58) Field of Search ................................. 434/129, 188, 434/191, 201, 207, 209; 273/293, 302, 430

(56) References Cited

U.S. PATENT DOCUMENTS

| | | | | | |
|---|---|---|---|---|---|
| 1,246,152 | A | * | 11/1917 | Perrine ........................ | 273/296 |
| 2,801,855 | A | * | 8/1957 | Clay ........................... | 273/236 |
| 6,065,970 | A | * | 5/2000 | Elliott ......................... | 273/302 |
| 6,109,924 | A | * | 8/2000 | Sanford et al. .............. | 273/299 |

OTHER PUBLICATIONS

Conforti, Lauren, "Math Rummy Card Game" 2000, [online], [retrieved Aug. 26. 2003]. Retrieved from the Internet<URL:http://www.webeans.net/hutt/educ/mathrummydir.pdf>.*

Buckeye, Don, "Fast Rummy", Sep., 19, 1995, [online], [retrieved on Aug. 26, 2003]. Retrieved from the Internet <URL:http://explorer.scrtec.org/explorer~db/html/814917244-81ED7D4C.html>.*

"Multiplication Monsters of the Deep" Learning resources. at least Jun. 2000 online [retrieved on Aug. 27, 2002] Retrieved from the Internet URL:<http://www.learningresources.com>.*

Scarne, John. Scarne's Encyclopedia of Card Games. Harper & Row, Publishers Inc. New York; 1983, pp. 101–107.*

"A+ Math" online [retrieved on Feb. 27, 2002]. Retrieved from the Internet URL:<http://www.aplusmath.com>.*

"Happy Math" online [retrieved on Feb. 27, 2002]. Retrieved from the Internet URL:<http://www.happymath.com>.*

* cited by examiner

Primary Examiner—Teresa Walberg
Assistant Examiner—Julie Brocketti
(74) Attorney, Agent, or Firm—Baker Botts L.L.P.

(57) ABSTRACT

A method for playing an educational card game uses mathematical question cards and mathematical answer cards. The play proceeds with each player in turn drawing at least one card, determining matches between question cards and answer cards, and posting matches to the player's scoring area. An appropriate scoring criteria may be used to determine players scores after one player has discarded their final card. In a particular embodiment, the game may be implemented in a program running on a computer.

16 Claims, 8 Drawing Sheets

METHOD AND COMPUTER PROGRAM FOR PLAYING AN EDUCATIONAL CARD GAME THAT TEACHES MATHEMATICAL FACTS

TECHNICAL FIELD OF THE INVENTION

The present invention relates to the field of education, and more particularly to a method and computer program for playing an educational card game that teaches mathematical facts.

BACKGROUND OF THE INVENTION

The educational value of card games is often limited. While playing these games, players generally do not use higher-level mathematical skills to compete with other players. Flash cards may be used to teach higher-level mathematical skills, but do not provide for a fun, entertaining, or competitive learning environment.

SUMMARY OF THE INVENTION

In accordance with the present invention, a method and computer program for playing an educational card game that teaches mathematical facts are provided which eliminate or reduce disadvantages and problems associated with previous techniques. In a particular embodiment, the present invention provides the rules and structure for a card game, played with physical cards or on a computer, in which players identify matches between mathematical question cards and mathematical answer cards in a competitive and learning environment.

According to one embodiment of the present invention, a method for playing an educational card game that teaches mathematical facts includes the step of distributing cards to the players, where the cards include mathematical question cards and mathematical answer cards. Each player in turn then: draws at least one card; determines whether a mathematical question card and a mathematical answer card in the player's hand match and, if so, posts the matching cards to a scoring area associated with the player; determines whether a mathematical question card in the player's hand and a mathematical answer card previously played by another player match and, if so, posts the mathematical question card to the scoring area; and discards one of the cards held by the player. If the discarded card was not the player's last card then the method repeats for the next player. If the discarded card was the player's last card then the method calculates a score.

In accordance with another embodiment of the present invention, software for playing an educational game, embodied in a computer readable media, distributes cards to players, the cards including mathematical question cards and mathematical answer cards. For each player in turn, the software draws at least one card; determines whether a mathematical question card and a mathematical answer card in the player's hand match and, if so, posts the matched cards to a scoring area associated with the player in response to player input; determines whether a mathematical question card in the player's hand and a mathematical answer card previously player by another player match and, if so, posts the mathematical question card to the scoring area in response to player input; and discards one of the cards held by the player in response to player input. If the discarded card was not the player's last card, then the software repeats the steps for the next player. If the discarded card was the player's last card, then the software calculates a score.

The invention provides a number of technical advantages. The method and computer program for playing an educational card game teaches mathematical facts in a more engaging and competitive learning environment. Specifically, players are encouraged through a variety of opportunities to match mathematical questions to the appropriate mathematical answer, all in the environment of a card game. In a particular embodiment, each mathematical question card illustrates a product of two single digit numbers without an answer and each mathematical answer card illustrates a single number answer. By constantly identifying answers to mathematical questions, the players familiarize themselves and begin to master higher-level mathematical skills. In the specific embodiment for multiplication facts, a single mathematical answer card may match a number of mathematical question cards, which allows the players to appreciate the relationship among different multiplication facts. Moreover, the cards may be color-coded to illustrate the relationship between question and answers.

Further technical advantages include a set of specific rules that develop a competitive structure and nature to the learning environment. Specifically, for each turn a player can strategically choose between drawing a card from a set of undistributed cards or drawing a discarded card together with any other more recently discarded cards. In this manner, the player may strategically assess a number of different mathematical expressions before making this decision. Furthermore, once a player discards her last card, the present invention provides further learning opportunities in assessing the score. One possible scoring criteria determines a player's score as a first value of cards in the player's scoring area minus a second value of cards in the player's hand. Another possible scoring criteria determines a player's score as a first value equal to the sum of the mathematical answer cards in the player's scoring area minus a second value equal to the sum of the mathematical answer cards and the mathematical question cards left in the player's hand. Using these or numerous other scoring possibilities, the present invention provides further competitive and engaging instruction in mathematical facts. In the particular embodiment in which the educational card game is embodied in software, further teaching opportunities to become familiar with mathematical facts may include prompting the players for identification of matches or a calculation of scores.

Other technical advantages of the present invention will be readily apparent to one skilled in the art from the following figures, descriptions, and claims.

BRIEF DESCRIPTION OF THE DRAWINGS

For a more a complete understanding of the present invention and its advantages, reference is now made to the following descriptions, taken in conjunction with the accompanying drawings, in which.

DETAILED DESCRIPTION OF THE INVENTION

FIGS. 1–5 illustrate a series of turns that illustrate the overall structure and function of an educational card game 10 that teaches mathematical facts. Generally, game 10 includes question cards 20 and answer cards 22 arranged and grouped among the players in a particular manner. Each player has a hand 12a–12d (generally referred to as hand 12) and a scoring area 14a–14d (generally referred to as scoring area 14). A set of undistributed cards, called a stock pile 16, and one or more discarded cards 18 complete the arrangement of cards 20 and 22 in game 10. When playing game 10, each player in turn matches question cards 20 with answer cards 22 to score points. Game 10 exposes players to a variety of opportunities for developing and practicing higher-level mathematical skills in an engaging and stimulating environment.

Question cards 20 illustrate equations, problems, or other mathematical questions, and answer cards 22 provides answers to corresponding question cards 20. In the particular embodiment illustrated in FIGS. 1–6, question cards 20 illustrate multiplication facts, and answer cards 22 illustrate numeric answers. Alternatively, question cards 20 may illustrate any suitable combination of addition, subtraction, multiplication, division, or higher level of mathematical problems, such as algebra, geometry, trigonometry, calculus, or any other mathematical endeavor that allows matching of numeric, geometric, or symbolic questions and answers. Furthermore, game 10 contemplates an educational card game that teaches question and answer facts in other areas of discipline, such as history, geography, science, or any other discipline that poses questions to be matched with answers. In a particular embodiment, each question card 20 and its corresponding answer card 22 is color-coded to assist players in matching question cards 20 with answer cards 22.

To begin game 10, a number of question cards 20 and answer cards 22 are dealt to the players. In a particular embodiment, one player is randomly selected to be the dealer for the first round of game 10, and the players take turns dealing during subsequent rounds by rotating the responsibility in a clockwise or counter-clockwise direction. The dealer shuffles question cards 20 and answer cards 22 together and deals a particular number of cards 20 and 22 to each player. After dealing cards 20 and 22 to the players, the next card 20 or 22 from the deck is placed face up to start discard pile 18, and the remainder of the deck is placed face down to form stock pile 16.

After the cards are dealt, the players begin playing game 10 by taking turns drawing, melding, laying off, and discarding cards 20 and 22. In a particular embodiment, the players take turns in clockwise rotation, beginning with the player to the dealer's left. The object of game 10 is to score the most points by melding or laying off question cards 20 and answer cards 22 in scoring area 14.

At each player's turn, the player has to choose to either draw a card 20 or 22 from stock pile 16 or select any card 20 or 22 from discard pile 18. Stock pile 16 is face down, so the players may not see card 20 and 22 in advance of committing to draw from stock pile 16. If a player draws one of cards 20 or 22 from stock pile 16, the player adds card 20 or 22 to his hand 12 without showing it to the other players. Discard pile 18 is face up, so the players may see all cards 20 and 22 in discard pile 18. If a player selects one of cards 20 or 22 in discard pile 18, the player must take all cards 20 or 22 that follow selected card 20 or 22 in discard pile 18, and the player must dispose of selected card 20 in scoring area 14. If stock pile 16 runs out of cards 20 or 22 and the next player does not want to take any cards 20 or 22 from discard pile 18, discard pile 18 is turned over to form a new stock pile 16, and play continues.

After drawing card 20 or 22 from stock pile 16 or selecting cards 20 or 22 from discard pile 18, the player may dispose of cards in scoring area 14 by melding one of question cards 20 with its corresponding answer card 22 or by laying off individual question cards 20 and answer cards 22. Melding is the matching of one question card 20 with its corresponding answer card 22. For example, question card 20 with the multiplication fact "3×6" may be matched with answer card 22 with the number "18." Laying off is playing an individual question card 20 without its corresponding answer card 22 or playing an individual answer card 22 without its corresponding question card 20. A player may play an individual question card 20 or answer card 22 by matching card 20 or 22 with question cards 20 or answer cards 22 that have already been played in scoring area 14. For example, if one player has played question card 20 and its corresponding answer card 22 by melding, any player may dispose of question card 20 that matches the already-played question card 20, without having to play one of answer cards 22. Similarly, once a player has played individual question card 20 by laying off, any player may dispose of its corresponding answer card 22.

In a particular embodiment, question cards 20 include multiplication or addition facts, and a player may lay off an individual question card 20 only if question card 20 includes the reciprocal multiplication or addition fact of an already-played question card 20. For example, if a player has played question card 20 with the multiplication fact "4×2" and its corresponding answer card 22 with the number "8," another player may play question card 20 with the reciprocal multiplication fact "2×4" without having to play one of answer cards 22

A player ends his turn by discarding one of cards 20 or 22 from his hand. The players proceed in turn until one player has disposed of all cards 20 or 22 in his hand. In a particular embodiment, a player must discard one of cards 20 or 22 to win the game, and if a player doesn't have one card 20 or 22 to discard, he has to wait until his next turn to go out.

After a player goes out, all players total their points for the round. The players adds up the total of their answer cards 22 that were disposed of in a meld in scoring area 14 and subtract from this sum the total of cards 20 and 22 still left in their hand 12. The players determine the total points in their hand 12 by adding answer cards 22 and the answers to question cards 20.

Figure 1:
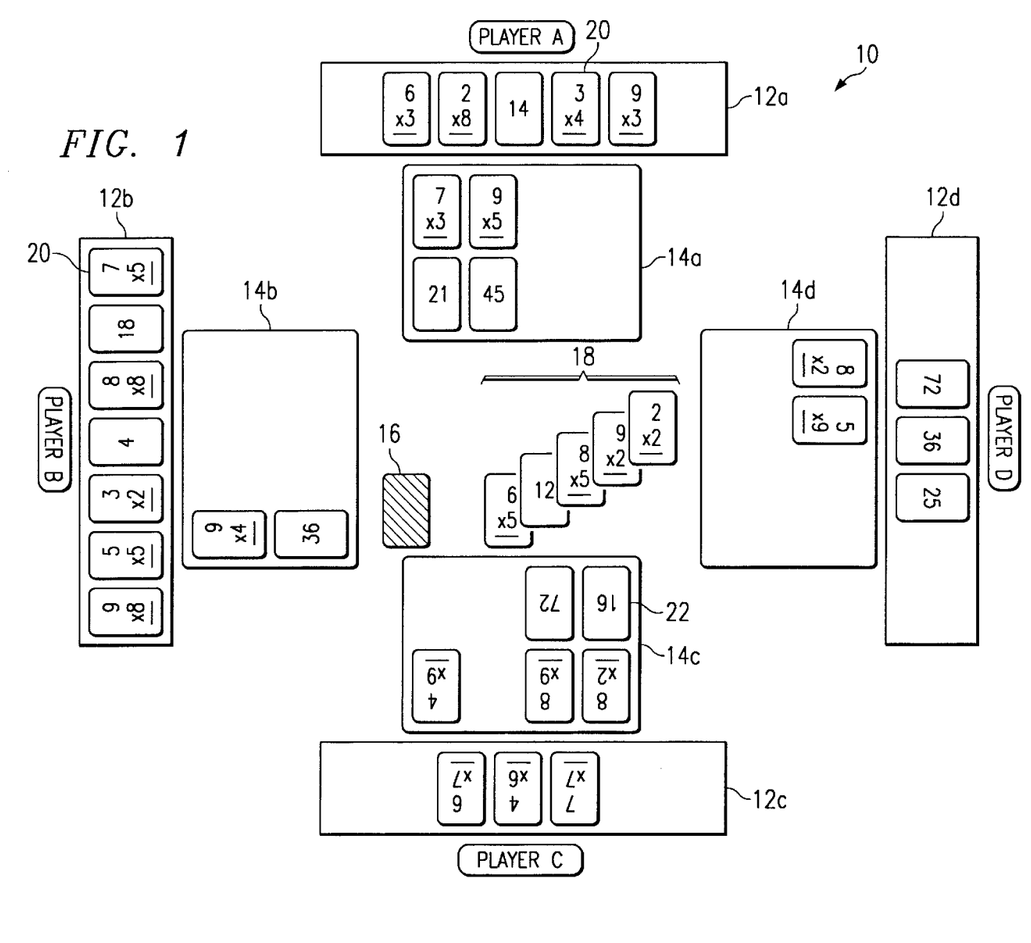
FIGS. 1–5 illustrate a series of turns in an educational card game that teaches mathematical facts in accordance with the present invention.

FIG. 1 illustrates the current state of game 10 immediately prior to player A's turn. Each player maintains a number of cards 20 and 22 in their hand 12 and scoring area 14. Stock pile 16 contains undistributed cards 20 and 22, and discard pile 18 represents cards 20 and 22 previously discarded by players in prior turns. In a particular embodiment, question cards 20 and answer cards 22 in scoring area 14 are arranged vertically to illustrate matching question cards 20 and answer cards 22 formed by melding. Also, as explained below, scoring area 14 may include question cards 20 that match with answer cards 22 in scoring areas 14 of other players.

Figure 2:
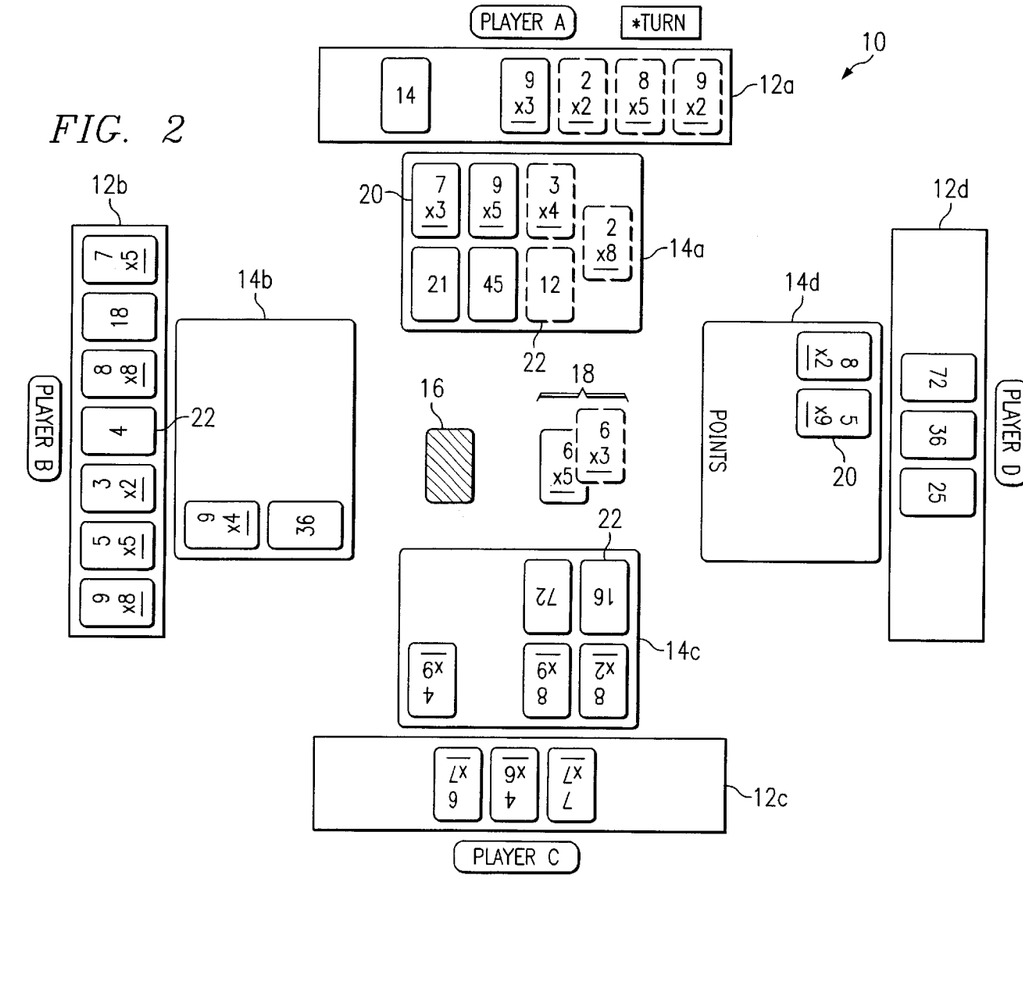

FIG. 2 illustrates game 10 after player A completes her turn. Cards 20, 22 that move between areas 12, 14, 16, 18 are shown in dashed lines. During this particular turn, player A chooses answer card 22 ("12") from discarded pile 18 and, therefore, must also place more recently discarded cards 18 ("8×5", "9×2", "2×2") in hand 12a. Player A then identifies a match between question card 20 ("3×4") and answer card 22 ("12") and posts this match in scoring area 14a. Player A also lays off question card 20 ("2×8"), which is a reciprocal of question card 20 ("8×2") in scoring area 14c of player C. Player A posts this question card 20 ("2×8") in scoring area 14a and discards question card 20 ("6×3"). This ends the turn for player A.

Figure 3:
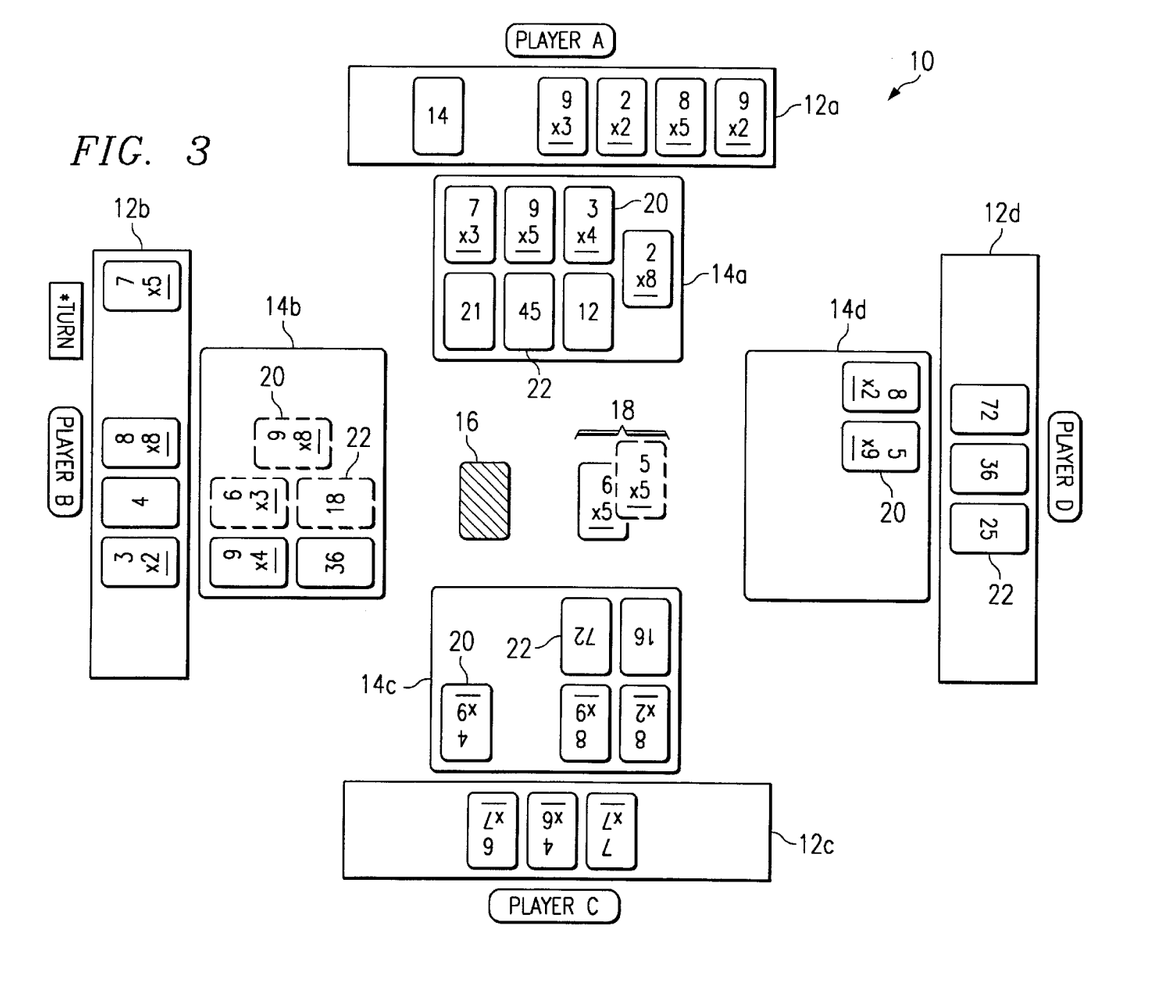

FIG. 3 illustrates game 10 after player B's turn. In this turn, player B draws question card 20 ("6×3") from discard pile 18, matches this card with answer card 22 ("18") in hand 12b, and posts this match to scoring area 14b. Player B also posts question card 20 ("9×8"), which is the reciprocal of question card 20 ("8×9") in scoring area 12c of player C. Player B then discards question card 20 ("5×5") and the turn ends.

Figure 4:
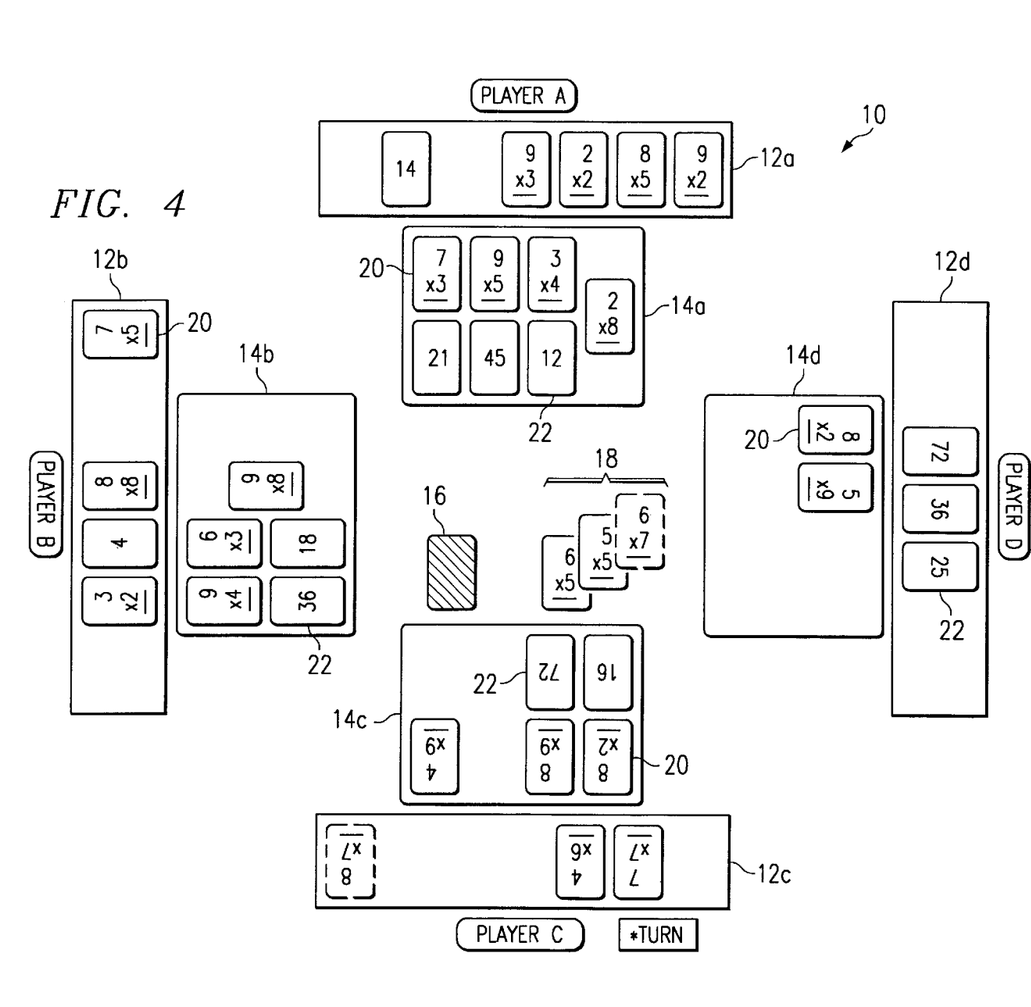

FIG. 4 illustrates moves made by player C. Player C draws an undistributed question card 20 ("8×7") from stock pile 16 and places this card in hand 12c. Having no question and answer matches in hand 12c or question cards 20 or answer cards 22 that player C can lay down individually, player C discards question card 20 ("6×7"), and the turn ends.

Figure 5:
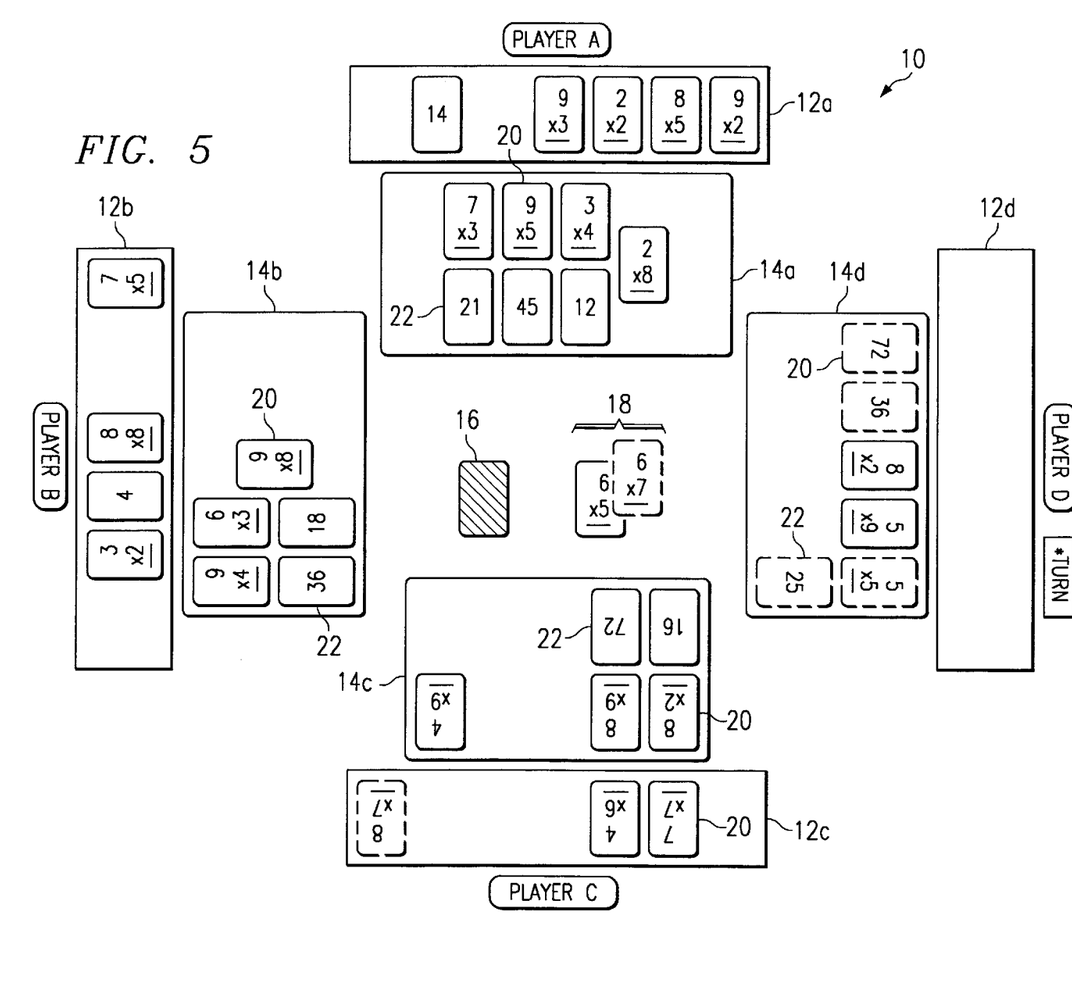

FIG. 5 illustrates player D's turn. First, player D draws two discarded cards 18 ("5×5", "6×7"). Next, player D posts a question and answer match ("5×5" and "25") in scoring area 14d. Player D also posts two answer cards 22 ("72", "36") that match question cards 20 in scoring areas 14b and 14c, respectively. Upon making these plays, player D discards her last card ("6×7"), and the round ends. Since, after discard, player D no longer maintains any cards 20 or 22 in hand 12d, game 10 proceeds to the scoring round.

Game 10 contemplates a variety of scoring criteria that provide a further opportunity for players to practice mathematical facts. In a particular embodiment, a player's score equals the sum of answer cards 22 in scoring area 14 minus the sum of answer cards 22 and question cards 20 in hand 12. Using this scoring criteria player A's score is −25 (21+45+12−14−(9×3)−(2×2)−(8×5)−(9×2)=−25). Similarly, the scores for players B, C, and D, respectively, using this scoring technique are −55, −41, and 133. Player D with the highest score has won this round of game 10. In addition, since player D was the first to empty her hand 12d of cards 20, 22, a suitable scoring criteria may also award bonus points to player D.

Another possible scoring criteria calculates the player's score as the sum of cards 20 and 22 in scoring area 14 minus the sum of cards 20 and 22 in hand 12. Using this scoring criteria the score for player A is 69 (21+45+12+(7×3)+(9×5)+(3×4)+(2×8)−14−(9×3)−(2×2)−(8×5)−(9×2)=69). Similarly, scores for players B, C, and D are, respectively, 71, 83, and 219. Game 10 contemplates any type of scoring criteria that takes into account the value of question cards 20 and/or answer cards 22 remaining in hand 12 and/or scoring area 14 of each player.

Figure 6:
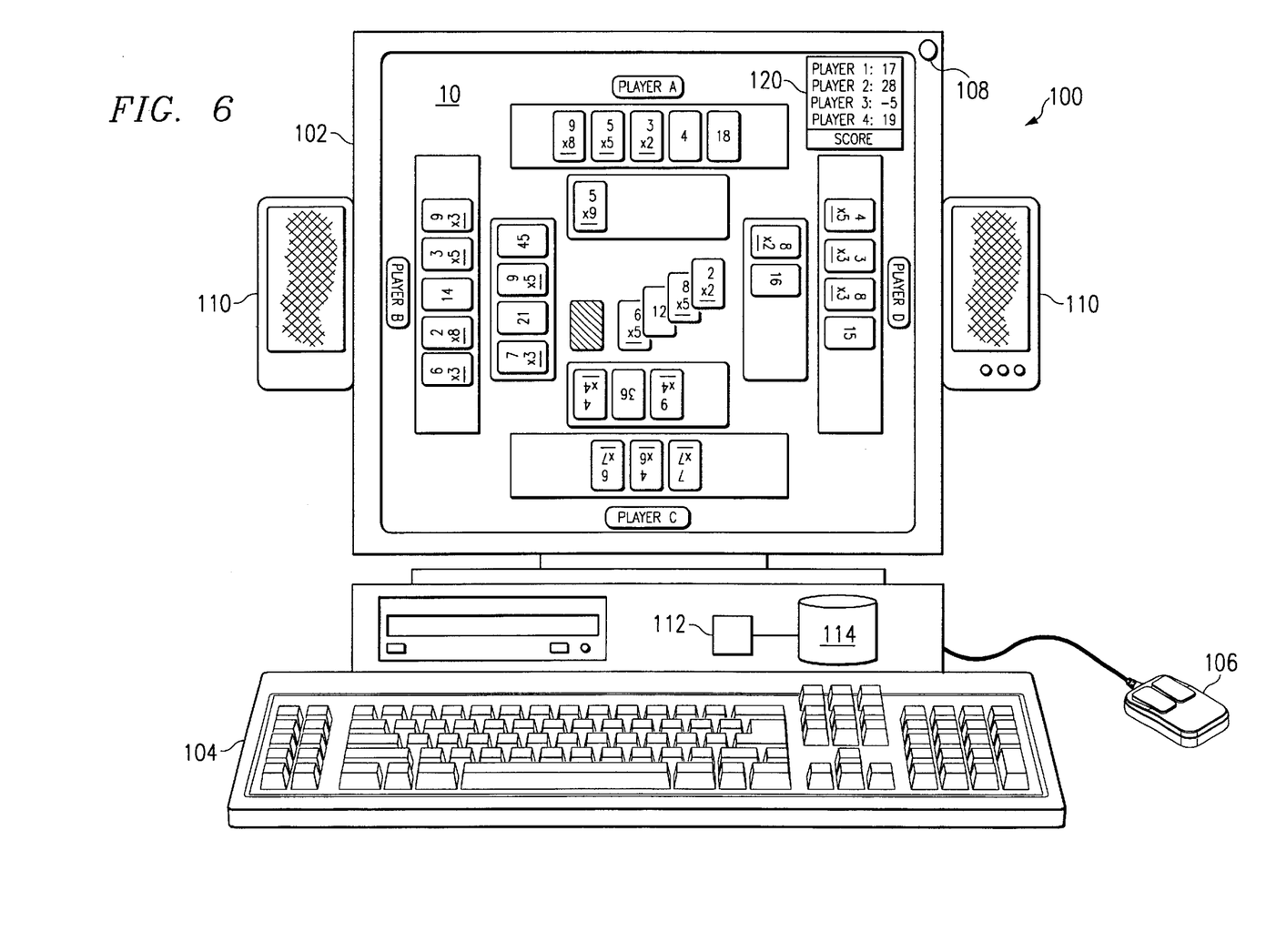
FIG. 6 illustrates a computer running software for playing the educational card game.

FIG. 6 illustrates game 10 executed on a computer 100. In general, computer 100 includes a display 102 for graphically displaying game 10, as well as a keyboard 104, mouse 106, microphone 108, or other suitable input device. Computer 100 may also include speakers 110 or other suitable output device that allows players to interact with computer 100. A processor 112, such as a microprocessor, controller, or other computing device or component, executes software stored in a memory 114 that may include volatile or nonvolatile memory storage components. For example, a program embodied in computer readable medium for playing game 10 may be loaded on computer 100 using removable media, permanently maintained in memory 114, or otherwise available for execution by processor 112.

In operation, computer 100 displays the arrangement of cards 20 and 22 among players in game 10 using display 102. For each turn, the player would use an appropriate input device to draw cards, determine matches, post cards to scoring areas 14, and perform discards. All of these activities may be performed in response to player input, whether prompted by computer 100 or not. Display 102 may order cards in any particular manner or arrangement, and may even vary the shape, color, or other presentation of cards to illustrate the relationship between question cards 20 that match answer cards 22. Computer 100 updates display 102 to reflect movement of cards made during each player's turn. A particular embodiment may include a scoring area 120 that displays the current running score among the players. As an added functionality, after each round of play, computer 100 may determine a player's score based on the associated scoring criteria, request the player to input the score, and provide feedback regarding the accuracy of the players calculation of their own score. This allows yet another opportunity for players to practice higher-level mathematical skills with immediate feedback. Computer 100 also contemplates any other appropriate display, prompting, and other input/output functionality that allows players to interact with game 10.

Figure 7A:
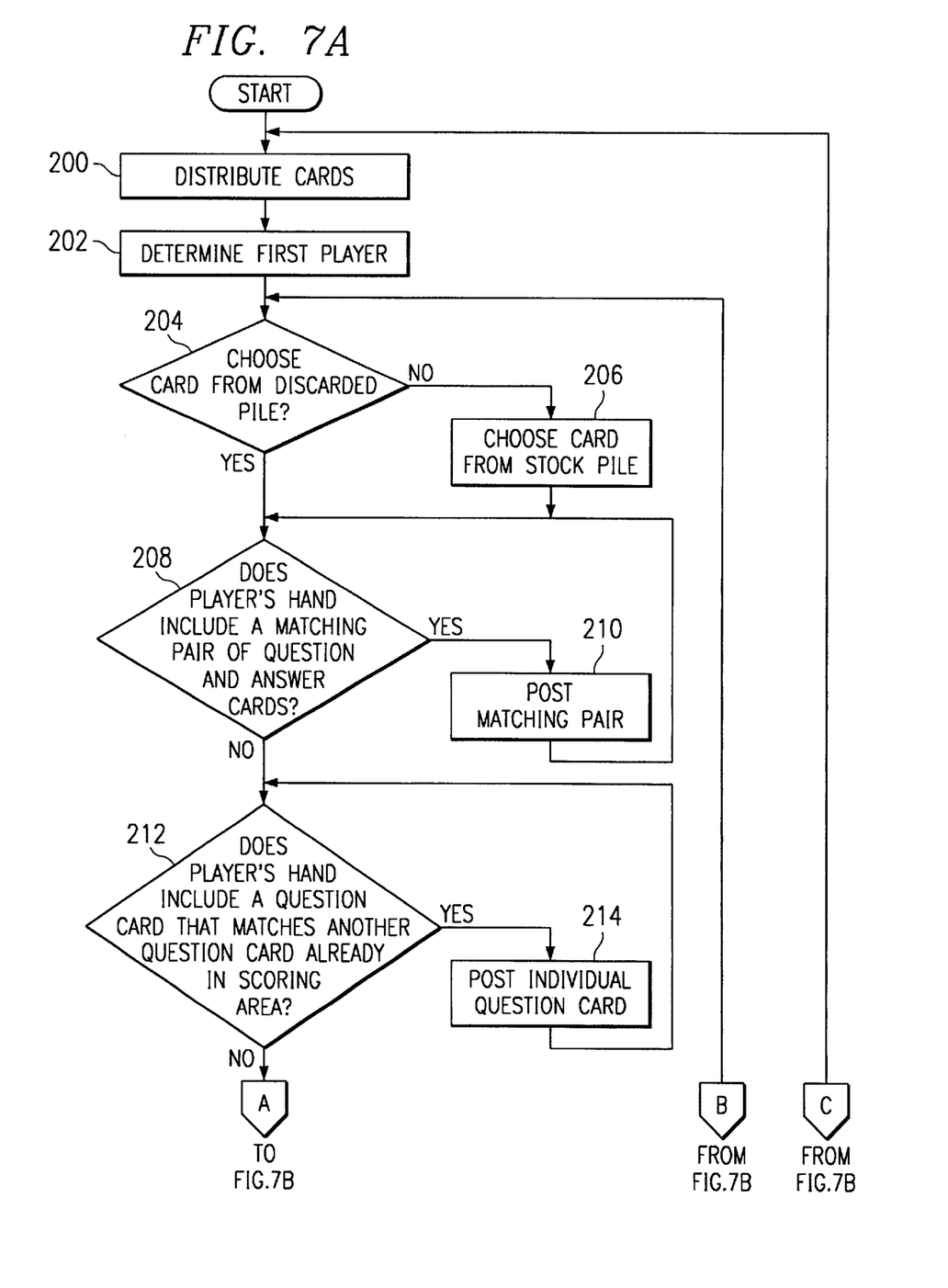
FIG. 7 illustrates a flow chart of a method for playing the educational card game.
Figure 7B:
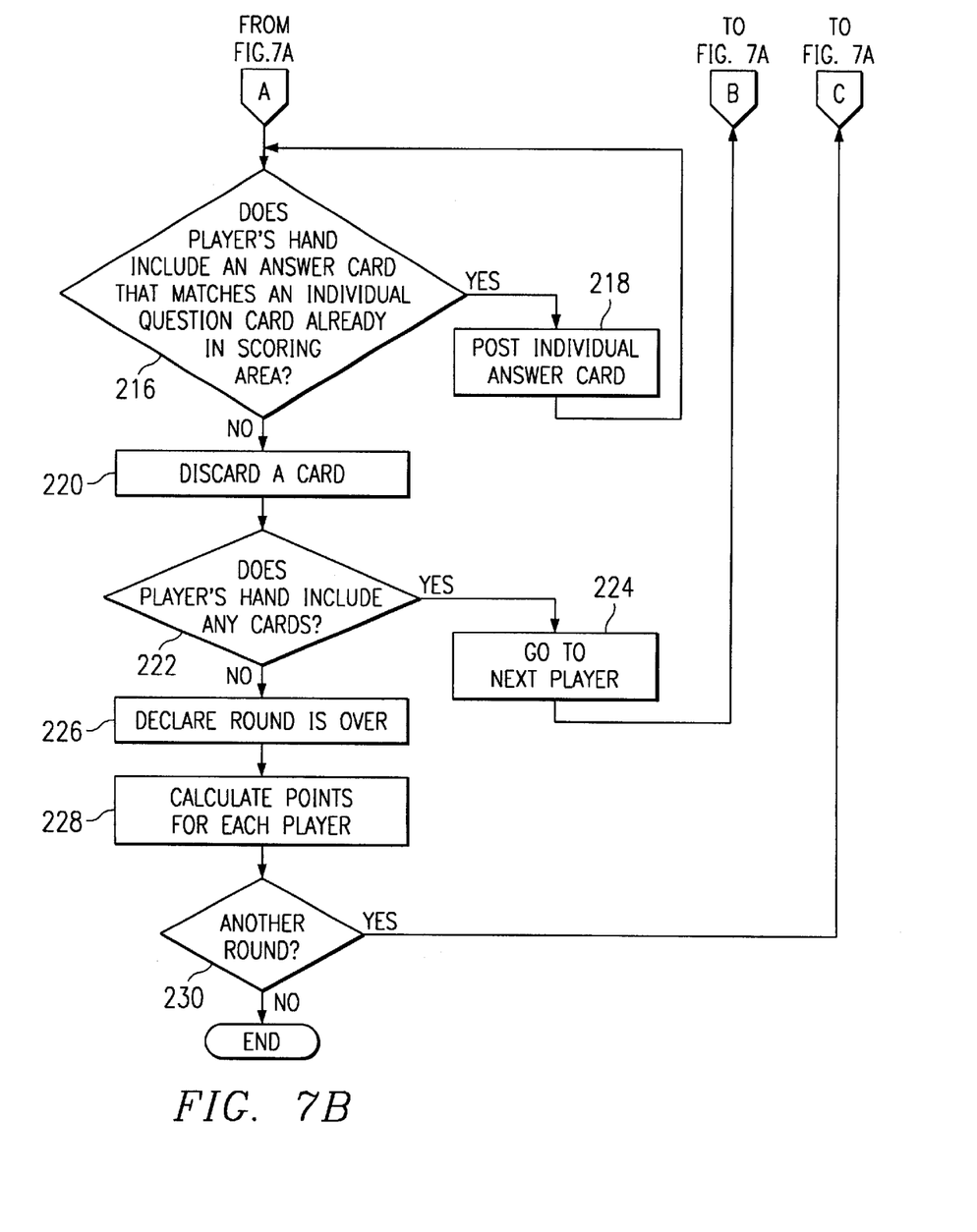

FIG. 7 is a flowchart of a method for playing game 10. Although the method is described with reference to the activities of players interacting with cards, this method also contemplates any functionality of arranging, displaying, selecting, prompting, and scoring performed by a computer running a program of game 10. The method begins at step 200 where cards are distributed to players and placed in their respective hands 12. The method then determines the first player at step 202. This first player designation at step 202 may rotate for each round of game 10.

The player, during her turn, then determines whether to choose a card or cards from discarded pile 18 at step 204. If the player selects a discarded card 18, the player must also place in her hand 12 any more recently discarded cards 18. If the player decides not to choose cards from discarded cards 18 at step 204, the player must choose a card from stock pile 16 at step 206. If the player's hand 12 includes a matching pair of question and answer cards 20 and 22 at step 208, the player may post the matching pair in her scoring area 14 at step 210. If the player's hand 12 includes a question card 20 that matches another question card 20 already posted in any player's scoring area 14 at step 212, then the player can post question card 20 in her scoring area 14 at step 214. If the player's hand 12 includes an answer card 22 that matches an individual question card 20 already in any player's scoring area 14 at step 216, the player may post answer card 22 in her scoring area 14 at step 218. The player may continue to identify and post matching question and answer cards 20 and 22 at steps 208–218 until the player's hand 12 does not include any matching cards 20 or 22. Alternatively, the player may decide not to post matching question and answer cards 20 in scoring area 14 for strategic purposes.

The play discards a card 20 or 22 at step 220. If the player's hand 12 still includes cards 20 or 22, the games move to the next player at step 224 and the method continues at step 204. If the player discarded her last card at step 220 and the player's hand 12 does not include any cards 20 or 22 at step 222, the round is over at step 226 and the players' points are calculated at step 228 using an appropriate scoring criteria. If another round is desired at step 230, the method continues at step 200.

Although the present invention has been described in several embodiments, a myriad of changes and modifications may be suggested to one skilled in the art and it is intended that the present invention encompass such changes and modifications as fall within the scope of the present appended claims.

What is claimed is:

1. A method for playing an educational card game that teaches mathematical facts, comprising:
   (a) distributing a plurality of cards to a plurality of players, the cards comprising a plurality of mathematical question cards and a plurality of mathematical answer cards, wherein each mathematical question card illustrates a mathematical question without an answer, and each mathematical answer card illustrates a numerical answer without a mathematical question;
   (b) for each player in turn:
      drawing at least one card;
      determining whether a mathematical question card and a mathematical answer card in a player's hand match and, if so, posting the matched cards to a scoring area associated with the player;
      determining whether a mathematical question card in the player's hand and a mathematical answer card previously played by another player match and, if so, posting the mathematical question card to the scoring area;
      discarding one of the unmatched cards held by the player;
      if the discarded card was not the player's last card, then repeating the steps in (b) for the next player;
   (c) if the discarded card was the player's last card, then calculating a score.

2. The method of claim 1, wherein:
   each mathematical question card illustrates a product of two single digit numbers without an answer; and
   each mathematical answer card comprises a single number answer.

3. The method of claim 1, wherein the cards comprise a plurality of mathematical question cards that match a single mathematical answer card.

4. The method of claim 1, wherein drawing at least one card further comprises either:
   drawing a card from a set of undistributed cards; or
   drawing a selected discarded card together with all other cards discarded after the selected discarded card.

5. The method of claim 1, wherein calculating a score comprises performing the following steps for each player:
   determining a first value of cards in the player's scoring area;
   determining a second value of cards left in the player's hand; and
   calculating the player's score as the first value minus the second value.

6. The method of claim 1, wherein calculating a score comprises performing the following steps for each player:
   determining a first value equal to the sum of the mathematical answer cards left in the player's scoring area; and
   determining a second value equal to the sum of the mathematical answer cards and the mathematical question cards in the player's hand;
   calculating the player's score as the first value minus the second value.

7. The method of claim 1, wherein the cards are color-coded to illustrate the relationship between mathematical question cards that match mathematical answer cards.

8. Software for playing an educational card game, the software being embodied in a computer readable media and operable to perform the following steps:
   (a) distributing a plurality of cards to a plurality of players, the cards comprising a plurality of mathematical question cards and a plurality of mathematical answer cards, wherein each mathematical question card illustrates a mathematical question without an answer, and each mathematical answer card illustrates a numerical answer without a mathematical question;
   (b) for each player in turn:
      drawing at least one card;
      determining whether a mathematical question card and a mathematical answer card in a player's hand match and, if so, posting the matched cards to a scoring area associated with the player in response to player input;
      determining whether a mathematical question card in the player's hand and a mathematical answer card previously played by another player match and, if so, posting the mathematical question card to the scoring area in response to player input;
      discarding one of the unmatched cards held by the player in response to player input;
      if the discarded card was not the player's last card, then repeating the steps in (b) for the next player;
   (c) if the discarded card was the player's last card, then calculating a score.

9. The software of claim 8, wherein:
   each mathematical question card illustrates a product of two single digit numbers without an answer; and
   each mathematical answer card comprises a single number answer.

10. The software of claim 8, wherein the cards comprise a plurality of mathematical question cards that match a single mathematical answer card.

11. The software of claim 8, wherein drawing at least one card further comprises either:
   drawing a card from a set of undistributed cards; or
   drawing a selected discarded card together with all other cards discarded after the selected discarded card.

12. The software of claim 8, wherein calculating a score comprises performing the following steps for each player:
   determining a first value of cards in the player's scoring area;
   determining a second value of cards left in the player's hand; and
   calculating the player's score as the first value minus the second value.

13. The software of claim 8, wherein calculating a score comprises performing the following steps for each player:
   determining a first value equal to the sum of the mathematical answer cards in the player's scoring area;
   determining a second value equal to the sum of the mathematical answer cards and the mathematical question cards left in the player's hand; and
   calculating the player's score as the first value minus the second value.

14. The software of claim 8, wherein the cards are color-coded to illustrate the relationship between mathematical question cards that match mathematical answer cards.

15. The software of claim 8, wherein calculating a score comprises performing the following steps for each player:
   calculating a first score based on cards in the player's scoring area and cards left in the player's hand;
   receiving a second score from the player; and
   comparing the first score to the second score to provide feedback to the player on the accuracy of the second score.

16. A method for playing an educational card game that teaches mathematical facts, comprising:

(a) distributing a plurality of cards to a plurality of players, the cards comprising a plurality of mathematical question cards and a plurality of mathematical answer cards, wherein each mathematical question card illustrates a product of two single digit numbers without an answer and each mathematical answer card comprises a single number answer without a mathematical question, whereby a plurality of mathematical question cards match a single mathematical answer card;

(b) for each player in turn:

drawing either a card from a set of undistributed cards or a discarded card together with all other cards discarded after the discarded card;

determining whether a mathematical question card and a mathematical answer card in a player's hand match and, if so, posting the matched cards to a scoring area associated with the player;

determining whether a mathematical question card in the player's hand and a mathematical answer card previously played by another player match and, if so, posting the mathematical question card to the scoring area;

discarding one of the unmatched cards held by the player;

if the discarded card was not the player's last card, then repeating the steps in (b) for the next player;

(c) if the discarded card was the player's last card, then for each player:

determining a first value equal to the sum of the mathematical answer cards in the player's scoring area;

determining a second value equal to the sum of the mathematical answer cards and the mathematical question cards left in the player's hand; and calculating the player's score as the first value minus the second value.

* * * * *